(12) United States Patent
Tahara et al.

(10) Patent No.: US 7,262,241 B2
(45) Date of Patent: Aug. 28, 2007

(54) RUBBER COMPOSITION FOR TIRE TREAD

(75) Inventors: Narihiro Tahara, Kobe (JP); Mamoru Uchida, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 09/903,694

(22) Filed: Jul. 13, 2001

(65) Prior Publication Data
US 2002/0026003 A1 Feb. 28, 2002

(30) Foreign Application Priority Data

Jul. 14, 2000 (JP) ............... 2000-214225
Aug. 1, 2000 (JP) ............... 2000-233469

(51) Int. Cl.
*C08K 3/40* (2006.01)
*C08K 3/04* (2006.01)
*C08K 3/22* (2006.01)
*C08K 3/36* (2006.01)

(52) U.S. Cl. ............... 524/494; 524/437; 524/495

(58) Field of Classification Search ............... 524/492, 524/495, 496, 445, 447, 449, 433
See application file for complete search history.

(56) References Cited

U.S. PATENT DOCUMENTS

| 4,100,122 | A | | 7/1978 | Kent | |
|---|---|---|---|---|---|
| 4,517,336 | A | * | 5/1985 | Wolff et al. | 524/571 |
| 5,663,226 | A | * | 9/1997 | Scholl et al. | 524/262 |
| 5,788,786 | A | | 8/1998 | Yamauchi et al. | |
| 6,025,415 | A | * | 2/2000 | Scholl | 523/213 |
| 6,058,994 | A | | 5/2000 | Amino et al. | |
| 6,277,902 | B1 | * | 8/2001 | Scholl | 523/213 |
| 6,489,389 | B1 | * | 12/2002 | Ohta et al. | 524/437 |
| 2002/0037950 | A1 | * | 3/2002 | Mizuno et al. | 524/35 |
| 2002/0132904 | A1 | * | 9/2002 | Langstein et al. | 524/495 |

FOREIGN PATENT DOCUMENTS

| EP | 0697432 A1 | | 2/1996 |
|---|---|---|---|
| EP | 0 945 482 A1 | | 9/1999 |
| EP | 1 006 007 A2 | | 7/2000 |
| JP | 7-149950 | | 6/1995 |
| JP | 9-109618 | | 4/1997 |
| JP | 9-241427 | | 9/1997 |
| JP | 409241427 A | * | 9/1997 |
| JP | 9-278941 | | 10/1997 |
| JP | 10-25373 | | 1/1998 |
| JP | 11-268505 | | 10/1999 |
| JP | 2000178379 | * | 6/2000 |

* cited by examiner

*Primary Examiner*—Tae H Yoon
(74) *Attorney, Agent, or Firm*—Birch, Stewart, Kolasch & Birch, LLP

(57) ABSTRACT

There is provided a rubber composition for a tire tread having a remained despersibility of reinforcing agents without increased rubber hardness, an improved performance on snow and ice road, and an improved abrasion resistance, and inhibited from increasing in hardness or inhibited from increasing in hardness with the passage of time. A rubber composition for a tire tread, which comprises (a) a diene rubber, (b) glass fibers, (c) a reinforcing agent, and 1 to 15 parts by weight of (d-1) inorganic powders having a Mohs hardness of less than 6.5 and an average particle-size of less than 25 μm and/or (d-2) silicone rubber powders based on 100 parts by weight of the diene rubber.

5 Claims, No Drawings

RUBBER COMPOSITION FOR TIRE TREAD

BACKGROUND OF THE INVENTION

The present invention relates to a rubber composition for a tire tread, and particularly relates to a rubber composition for a tire tread improving a tire in a performance on snow and ice road without decreasing in abrasion resistance.

A large number of patents disclosed that mixing short fibers (synthetic fibers, natural fibers, glass fibers, carbon fibers and the like) with a rubber improves the performance on snow and ice road and the abrasion resistance. Among these short fibers, inorganic fibers, for example, glass fibers can improve the performance. This is caused by that glass fibers are harder than ice and scratch ice. On the contrary, organic fibers (pulp, polyethylene, polyester, nylon and the like) are softer than ice and not expected to scratch ice.

However, inorganic fibers are hard materials, and tend to lead the rubber composition to hard in proportion to the amount thereof.

Generally, the hardness is adjusted by using liquid components such as petroleum softeners (aromatic oil, naphthene oil, paraffin oil, and the like) and low temperature plasticizers (dioctyl phthalate (DOP), dibutyl phthalate (DBP) and the like).

An increased amount of the liquid components are expected to decrease dispersibility of reinforcing agents (carbon black, silica and the like). The decreased dispersibility of reinforcing agents does not provide rubber property as planed, and provide decreased performance on ice road and decreased abrasion resistance.

For example, it is known that a spike tire is increased in performance on snow and ice road and abrasion resistance by using a rubber composition for a spike pin obtained by mixing polyamide short fibers or aramide short fibers with a rubber (e.g., Japanese unexamined patent publication No. 109618/1997). However, the tire of the rubber composition comprising polyamide short fibers or aramide short fibers is a spike tire having a problem in damage of a road surface. Further, organic fibers require a step for cutting long fibers to short fibers. Furthermore, organic fibers have a large number of problems in work environment or the like because of a low specific gravity and tendency to easily splash, and a problem of insufficient dispersion because of difficulty in dispersing in a mixing step.

Those are known that a tire showing a high friction force on snow and ice road, a low damage on a road surface, and a high tire performance can be produced from a rubber composition obtained by mixing cured powders of a hardening resin with a rubber (Japanese unexamined patent publication No. 278941/1997), that a studless tire having an excellent grip performance on ice road can be produced from a tread rubber composition obtained by mixing a silicone polymer with a rubber (Japanese unexamined patent publication No. 241427/1997), that a pneumatic tire having an excellent performance on snow and ice road and wet skid characteristics can be obtained by forming a foam rubber layer of a rubber composition comprising silica, carbon black or the like (Japanese unexamined patent publication No. 258469/1995).

However, the tire of a rubber composition obtained by mixing cured powders of a hardening resin has an insufficient performance on snow and ice road and a decreased abrasion resistance because the powders fall easily from the rubber composition. The tire of the tread rubber composition comprising a silicone polymer has a lower performance on snow and ice road than that comprising glass fibers.

The tire with a foam rubber layer of a rubber composition comprising silica, carbon black or the like has a problem of increasing in rubber hardness and decreasing in performance on snow and ice road with the passage of time when the ultrafine powders of reinforcing agents (carbon black, or silica) are used for improving the decreased abrasion resistance.

SUMMARY OF THE INVENTION

The object of the present invention is to provide a rubber composition for a tire tread that has remained dispersibility of reinforcing agents without increased rubber hardness, and can improve the performance on snow and ice road and the abrasion resistance.

The another object of the present invention is to provide a rubber composition for a tire tread that can improve the performance on snow and ice road and the abrasion resistance, and is inhibited from increasing in the rubber hardness with the passage of time.

The inventors have studied to improve the prior arts having the problems shown above, and found that a studless tire of a rubber composition comprising inorganic fibers having a high specific gravity and cut by mechanical shearing in a mixing step and at least one of carbon black, silica and the like can be improved by inhibiting the hardness from increasing following the use of inorganic fibers, carbon black, silica or the like by using petroleum softners (aromatic oil, naphthene oil, paraffin oil and the like) or low temperature plasticizers (DOP, DBP or the like).

However, petroleum softners and low temperature plasticizers are dissipated by volatilization or the like and lead the rubber hardness to increase. Increasing in the rubber hardness is fatal to the performance on snow and ice road. Adjusting the hardness with vulcanization system with sulfur and a vulcanization accelerator can inhibit the hardness from increasing with the passage of time, but decreases the abrasion resistance.

The inventors found that using a silicone rubber powders with or without softners as replacement of softners such as petroleum softners, low temperature plastisizers and the like solves the problem of dissipation of softners with the passage of time.

The inventors have further studied and found that a rubber composition obtained by mixing glass fibers and reinforcing agents with a diene rubber can be improved in the performance on snow and ice road and the abrasion resistance without increasing in the hardness by mixing a specific kind of inorganic powders and can be inhibited from increasing in the hardness with the passage of time by mixing silicone rubber powders.

The present invention relates to a rubber composition for a tire tread, which comprises (a) a diene rubber, (b) glass fibers, (c) a reinforcing agent and 1 to 15 parts by weight of (d-1) inorganic powders softer than the glass fibers and having an average particle-size of less than 25 µm and/or (d-2) silicone rubber powders based on 100 parts by weight of the diene rubber.

DETAILED DESCRIPTION

The rubber composition of the present invention can be obtained by mixing (a) a diene rubber, (b) glass fibers to increase the performance on snow and ice road and the abrasion resistance, (c) a reinforcing agent (e.g., carbon black, silica) to increase the abrasion resistance, and (d-1) inorganic powders to inhibit the rubber hardness from increasing and/or (d-2) silicone rubber powders to inhibit the rubber hardness from increasing with the passage of time.

Examples of the diene rubber used in the present invention include a natural rubber, and a synthetic diene rubber such as a styrene-butadiene rubber (SBR), a butadiene rubber (BR), an isoprene rubber (IR), an ethylene-propylene-diene rubber, a chloroprene rubber, an acrylonitrile-butadiene rubber, an isoprene-isobutylene rubber (IIR), or a harogenated butyl rubber (X-IIR). A diene rubber having a glass transition temperature (Tg) of at most −30° C. is preferable from the viewpoint of the properties at low temperature. These can be used singly or in combination of two or more of them.

In the present invention, glass fibers are used selectively from a large number of inorganic fibers, because are inexpensive, can increase the performance on snow and ice road and the abrasion resistance of the tire, and can decrease the cost by improving the process. Glass fibers focus in an even length to stabilize the performance of the rubber composition preferably.

The process can be improved to decrease the cost, because glass fibers are cut easily by mechanical shearing in a mixing step and enable the cutting step for long fibers to be omitted, and because short fibers have a low specific gravity and are inhibited from splashing in the process. Organic fibers are not cut by shearing force in a mixing step and require a cutting step, and splash easily and require a countermeasure.

The glass fibers have a diameter of preferably at most 100 µm, more preferably 1 to 100 µm, further preferably 3 to 50 µm, and most preferably 5 to 50 µm. Glass fibers having a diameter of smaller than 1 µm do not dig and scratch an ice road surface. On the other hand, glass fibers having a diameter of larger than 100 µm decrease the adhesion component of friction and the hysteresis component of friction of the rubber composition and tend to provide an insufficient adhesion component of friction or an insufficient hysteresis component of friction.

The glass fibers have a length of preferably 0.1 to 20 mm, more preferably 0.1 to 10 mm, further preferably 0.1 to 5 mm, much more preferably 0.1 to 3 mm, and most preferably 0.2 to 3 mm. Glass fibers shorter than 0.1 mm tend to drop from the tread surface during running. On the other hand, glass fibers longer than 5 mm tend to lead processing the rubber composition to be difficult.

Glass fibers have an aspect ratio in the range of preferably 2 to 4000, and more preferably 4 to 2000.

The grass fibers have a Mohs hardness ordinary in the rage of about 6 to about 7, and nearly 6.5.

The glass fibers are used in an amount of preferably 2 to 30 parts by weight, more preferably 2 to 28 parts by weight, and most preferably 2 to 20 parts by weight based on 100 parts by weight of the diene rubber. Glass fibers used in the amount of less than 2 parts by weight tend to decrease in the amount of protruding from the tread surface, dig and scratch insufficiently, and improve the performance on snow and ice road and the abrasion resistance insufficiently. More than 30 parts by weight of glass fibers tend to increase block stiffness of tread rubber excessively and tend to inhibit the tread rubber surface from following snow and ice road. Glass fibers are hard materials, lead the rubber composition to hard proportional to the amount thereof, and tend to improve the performance on snow and ice road insufficiently because of the excessively high hardness of the tire.

In the present invention, glass fibers orienting vertically to the tire tread surface can improve the performance on snow and ice road and the abrasion resistance. Glass fibers can be oriented vertically to the tire tread surface by rolling a rubber composition comprising the glass fibers with a calendar roll and by folding a provided sheet.

The rubber composition of the present invention contains a reinforcing agent such as carbon black, or silica.

In the present invention, carbon black used for a rubber composition for a tire can be used without limitation. Carbon black used preferably has a nitrogen absorption specific surface area ($N_2SA$) of at least 83 $m^2/g$ and a dibutyl phthalate absorption (DBP) of at least 102 ml/100 g. Examples of carbon black include SAF, ISAF-HM, ISAF-LM, ISAF-HS, HAF.

In the present invention, silica used for a rubber composition for a tire can be used without limitation. Silica used preferably has a nitrogen absorption specific surface area ($N_2SA$) of at least 150 $m^2/g$. Examples of silica include silica from a dry process (anhydrous silicate), and silica from a wet process (hydrous silicate). Silica from a wet process is preferably used. Examples of silica from a wet process include Nipsil AQ (trade name) available from Nippon Silica Industrial Co., Ltd.

Carbon black and silica can be used singly or in combination. Silica is preferably blended and used from the viewpoints of the performance on snow and ice road and the wet grip performance.

Carbon black singly used as the reinforcing agent is used in an amount of preferably 5 to 70 parts by weight, and more preferably 5 to 60 parts by weight based on 100 parts by weight of the diene rubber. Less than 5 parts by weight of carbon black lead the rubber composition to a low hardness and a low abrasion resistance. More than 70 parts by weight of carbon black lead the rubber composition to an increased hardness and an decreased performance on snow and ice road.

Silica used singly as the reinforcing agent is used in an amount of preferably 10 to 80 parts by weight, and more preferably 15 to 60 parts by weight based on 100 parts by weight of the diene rubber. Less than 10 parts by weight of silica tend to lead the rubber composition to an insufficient wet skid characteristics. More than 80 parts by weight of silica tend to lead the rubber composition to increase in hardness and decrease in performance on snow and ice road.

Carbon black and silica used in combination are used in a total amount of preferably 5 to 80 parts by weight, and more preferably 5 to 60 parts by weight based on 100 parts by weight of the diene rubber.

Glass fibers and a reinforcing agent such as carbon black, or silica are used in a total amount of preferably 7 to 110 parts by weight, and more preferably 7 to 80 parts by weight based on 100 parts by weight of the diene rubber. Glass fibers are used in a ratio of preferably 2 to 50% by weight, more preferably 3 to 40% by weight based on the total amount of the glass fibers and the reinforcing agent from the view point of the valance between the performance on snow and ice road and the abrasion resistance.

In the present invention, based on the hardness of the inorganic fibers, inorganic powders softer than the inorganic fibers are used to remain the rubber hardness and dispersibility of the reinforcing agent. Inorganic powders softer than the inorganic fibers are used to inhibit the rubber hardness from increasing. Inorganic powders to be used can have a Mohs hardness of not more than 6.5, preferably not more than 4.5, and more preferably not more than 3, and ordinary not less than 2.

Examples of the inorganic powders include clay (aluminum silicate, the composition formula: $SiO_2/Al_2O_3/Fe_2O_3/TiO_2$, Mohs hardness: 2 to 2.5), aluminum hydroxide (the composition formula: $Al(OH)_3$, Mohs hardness: 3), magnesium hydroxide (the composition formula: $Mg(OH)_2$, Mohs hardness: 2 to 3), calcium silicate (the composition formula: $CaSiO_3$, Mohs hardness: 4.5), mica (the composition formula: $A_{1-x}B_{2-3}[(OH, F)_2X_4O_{10}]$; A=K, Na, Ca, Ba, $NH_4$, $H_3O$, □ (void); B=Al, Fe(III), Mg, Fe(II), Mn(II), Li, Zn, V(III), Cr(III), Ti; X=Si, Al, Be, Fe(III); x=0 to 0.5, Mohs hardness: 2.5 to 3) and the like.

Mohs hardness used herein is one of mechanical properties of materials and also an evaluation method for minerals used traditionally and generally. In this method, someone cut by scratching with the following ten kinds of minerals one by one is estimated to have lower hardness than the mineral. From the mineral of the lowest hardness, 1: talc, 2: gypsum, 3: calcite, 4: fluorite, 5: apatite, 6: orthoclase, 7: rock crystal, 8: topaz, 9: corundum, and 10: diamond are used in series.

Inorganic powders having an average particle-size of less than 25 µm, and preferably not more than 20 µm can be used. Inorganic powders having too large average particle-size tend to decrease the abrasion resistance. Inorganic powders having a greater average particle-size than the reinforcing agent can improve dispersibility of the reinforcing agent. The inorganic powders have an average particle-size of preferably not less than 0.03 µm, and more preferably not less than 0.1 µm.

Inorganic powders are used in an amount of preferably 1 to 15 parts by weight, and more preferably 2 to 12 parts by weight based on 100 parts by weight of the diene rubber. Less than 1 parts by weight of inorganic powders cannot improve dispersibility of the reinforcing agent and cannot provide a desirable property. More than 15 parts by weight of inorganic powders tend to decrease the durability.

A process for using inorganic powders is simple and easy and merely comprises adding the inorganic powders to a diene rubber.

Silicone rubber powders have a lipophilic property and a high oil absorption, inhibit dissipation of the softener with the passage of time when used with softners such as a petroleum softner, or a low temperature plasticizer while inhibit the rubber composition from increasing in hardness, and maintain the softner in active for a long time. Glass fibers improve the performance on snow and ice road. Glass fibers and reinforcing agent such as carbon black or silica in combination improve the abrasion resistance. Soft silicone rubber powders having a lipophilic property and a high oil absorption improve the performance on snow and ice road, inhibit dissipation of the softner with the passage of time when used with softners, and balance the performance on snow and ice road with the abrasion resistance.

Silicone rubber powders have a size of preferably 2 to 100 µm, and more preferably 3 to 70 µm in the viewpoint of the balance of the performance on snow and ice road with the abrasion resistance.

Silicone rubber powders are used in an amount of 1 to 15 parts by weight, preferably 2 to 10 parts by weight based on 100 parts by weight of the diene rubber. Less than 1 parts by weight of silicone rubber powders inhibits the rubber composition insufficiently from increasing in hardness and achieves a decreased effect carrying the softner when used with the softner. More than 15 parts by weight of silicone rubber powders decrease the abrasion resistance and increases the cost.

Examples of a softner includes a generally used softner without limitation, for example, a petroleum softner, such as aromatic oil, naphthene oil or paraffin oil, a low temperature plasticizer, such as DOP or DBP. Paraffin oil is preferably used from the viewpoint of the properties at low temperature important for the performance on snow and ice road.

A softner is used in an amount of preferably 0 to 50 parts by weight, and more preferably at most 40 parts by weight based on the diene rubber. A softner is used preferably in an amount of at least 1 parts by weight from the viewpoint of achieving a sufficient effect. More than 50 parts by weight of a softner tend to increase changes with the passage of time.

Silicone rubber powders are available in non-oil extended conditions. Silicone rubber powders absorb a softner and inhibit dissiapation of a softner when used with a softner. Silicone rubber powders absorb numeral times by weight of a softner.

Examples of silicone rubber powders include Torefil series available from Dow Corning Toray silicone Co., Ltd.

The composition of the present invention preferably comprises a silane-coupling agent. A silane-coupling agent increases the rubber strength and the abrasion resistance when used with silica.

Examples of silane-coupling agent include bis (3-triethoxysililpropyl) tetraslufide, bis (2-triethoxysililethyl) tetraslufide, bis (3-trimethoxysililpropyl) tetrasulfide, bis (2-trimethoxysililethyl) tetraslufide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitoropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysililpropyl-N,N-dimethylthiocrbamoyltetrasulfide, 3-triethoxysililpropyl-N,N-dimethylthiocarbamoyltetrasulfide, 2-triethoxysililethyl-N,N-dimethylthiocarbamoyltetrasulfide, 3-trimethoxysililpropylbenzothiazoltetrasulfide, 3-triethoxysililpropylbenzothiazoltetrasulfide, 3-triethoxysililpropylmethacrylatemonosulfide, 3-trimethoxysililpropylmethacrylatemonosulfide, bis (3-diethoxymethylsililpropyl) tetrasulfide, 3-mercaptopropyldimethoxymethylsilane, 3-nitropropyldimethoxymethylsilane, 3-chloropropyldimethoxymethylsilane, dimethoxymethylsililpropyl-N,N-dimethylcarbamoyltetrasulfide, dimethoxymethylsililpropylbenzothiazoltetrasulfide.

Bis(3-triethoxysililpropyl)tetrasulfide, 3-trimethoxysililpropylbenzothiazoltetrasulfide and the like can be used preferably.

A silane-coupling agent can be used in an amount of preferably 3 to 20% by weight, and more preferably 5 to 15% by weight based on the silica. Less than 3% by weight of a silane-coupling agent achieve a low coupling effect to increase the rubber strength and the abrasion resistance insufficiently. More than 20% by weight of a silane-coupling agent do not increase the rubber strength corresponding with the increased amount thereof and is not preferable from the viewpoint of the cost.

The rubber composition of the present invention can comprise required components and additives used generally in the rubber industry in the usual amount. Examples of the components and additives include, for instance, process oils (paraffin-base process oil, naphthene-base process oil, aromatic-base process oil and the like), vulcanization agents (sulfur, sulfur chloride compounds, organic sulfur compounds and the like), vulcanization accelerators (guanidine-base, aldehyde/amine-base, aldehyde/ammonia-base, thiazole-base, sulfenamide-base, thiourea-base, thiuram-base, dithiocarbamate-base, Zandate-base compound and the like), crosslinking agents (radical generators such as organic peroxide compounds, azo compounds, oxime compounds, nitroso compounds, polyamine compounds and the like), antioxidants (amine derivatives such as diphenylaminebase, p-phenylenediamine-base, quinoline derivatives, hydroquinoline derivatives, monophenols, diphenols, thiobisphenols, hinderedphenols, phosphite esters and the like), waxes, stearic acid, zinc oxide, softeners, fillers, plasticizers, magnesium carbonate, calcium carbonate, whisker and the like.

The rubber composition for a tire tread of the present invention can be produced by mixing the above-mentioned components to each other in usual procedures and conditions with a mixer such as a banbury mixer. The mixing is preferably conducted at a temperature of 120 to 180° C. A tire can be obtained by forming and vulcanizing the above-mentioned rubber composition for a tire tread.

EXAMPLES

The present invention is explained in more detail based on the following Examples, but the present invention is not limited thereto.

Raw materials and evaluation methods used in Examples and Comparative Examples are shown below.

(Raw materials)

Natural rubber (NR): generally used RSS #3 grade.

Carbon black A: available from Showa Cabot K. K., $N_2SA$ of $79 \times 10^3$ m²/kg, DBP Oil Absorption of $102 \times 10^{-5}$ m³/kg, Aerage Prticle-Size of 0.03 μm.

Carbon black B: N330 available from Tokai Carbon Co., Ltd., $N_2SA$ of $83 \times 10^3$ m²/kg, DBP Oil Absorption of $102 \times 10^{-5}$ m³/kg.

Glass fibers: Micro-Glass Chopped Strand (trade name), available from Nippon Glass Fiber K.K., Diameter of 10 μm, Length of 0.4 mm, Aspect Ratio of 40.

HIGILITE H43: available from Showa Denko K.K., Average Particle-Size of 0.6 μm.

Suprex: available from J. M. Huber, Average Particle-Size of 0.3 μm.

HIGILITE H21: available from Showa Denko K.K., Average Particle-Size of 25 μm.

Silicone rubber powders: available from Dow Corning Toray Silicone Co., Ltd., Torefil E850 (trade name), Average Particle-Size of 70 μm.

Softener: Rubflex 26 available from Shell Chemical Co., Ltd.

Sulfer: available from Tsurumi Chemical K.K.

Vulcanization accelerator: Nocceller CZ available from Ouchishinko Chemical Industrial Co., Ltd.

(Evaluation method)

(1) Rubber hardness

Rubber hardness was measured according to JIS A method.

(2) Dispersibility of carbon black

Dispersibility of carbon black (CB) was measured according to ASTM D2663B method.

A test piece (about 3 mm×about 8 mm, and about 2 mm of thickness) of a vulcanized rubber composition was sampled, put on a sample table for a microtome, and cooled with liquid nitrogen or dry ice for hardening. A flake about 2 μm was made by using the microtome equipped with a glass knife and immersed in naphtha for swelling. The flake after swelling was spread on a slide prepared for a microscope equipped with an ocular lens having 10000 squares in total (one hundred squares each in length and width) of a lattice scale of 10 μm×10 μm, the total magnifying power was set up to 75 to 100 times, and the number of dispersible CB clusters of not ½ time smaller than the square was counted. A dispersion degree was calculated from the following equation. Although 100% is preferable in the dispersion degree, CB was evaluated GOOD in the dispersibility if not less than 95% and BAD if less than 95%.

Dispersion Degree (%)=100−S×U÷L

S: Total number of squares occupied with dispersible clusters of CB.

U: Swelling factor of sample for measurement (Area after swelling÷Area before swelling)

L: % by volume of CB in a compound (vulcanized rubber).

$L$=(parts by volume of CB)÷{(parts by volume of CB)+2×(parts by volume of rubber) +2×(parts by volume of oil (naphtha))}×100

(3) Performance on Ice Road

Tires having tire size/pattern of 185/70 R 14 HS3 were produced experimentally and measured for a stopping distance at the initial speed of 20 km/h on ice road. Performance on ice road was evaluated with an index calculated from the following equation based on Comparative Example 1 or Prior Art as reference. A higher index value indicates a better performance on ice road.

(Stopping Distance in Comp. Ex. 1)÷(Stopping Distance)×100

(4) Performance on Snow Road

Controllability in driving (feeling in braking and driving, and feeling in cornering) on snow road was evaluated based on Comparative Example 1 or Prior Art as 6. A higher value indicates a better performance on snow road.

(5) Abrasion Resistance

Tires having tire size/pattern of 185/70 R 14 HS3 were produced experimentally and abrasion test with vehicles is conducted by using Camry (trade name). After running through 5000 km, a tread pattern depth was measured, and a running distance in which the tread pattern depth was reduced 1 mm was calculated and indexed according to the following equation based on Comparative Example 1 or Prior Art as 100. A higher index value indicates a better abrasion resistance.

(Running distance reducing 1 mm) ÷(Running distance reducing 1 mm in Comp. Ex. 1)×100

(6) Change with Passage of Time

A rubber composition sample of 50 mm length, 50 mm wide and 10 mm thickness was produced under a vulcanization condition of 150° C. for 20 min. The sample was introduced in an oven of 80° C. for 100 hours for heat aging. An increased value of the hardness was evaluated as an index indicating a change with the passage of time. The hardness was measured according to JIS-A method. A change with the passage of time is evaluated with the following criterion.

A: The hardness increased not more than 3 points.

B: The hardness increased more than 3 points and less than 7 points of ΔHS.

C: The hardness increased not less than 7 points of ΔHS.

Examples 1 to 3 and Comparative Examples 1 to 5

A tire tread comprising glass fibers oriented vertically to the tire tread surface was produced by folding repeatedly a sheet of 1 mm thickness and 1.5 m width obtained by rolling the rubber composition shown in Table 1. Vulcanization was carried out at 150° C. for 50 hours. The obtained tire was evaluated as shown above. The results are shown in Table 1.

Example 4, Prior Art, and Comparative Examples 6 to 9

Samples and tires made of compositions shown in Table 2 were evaluated. The results are shown in Table 2.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- |
| Raw materials (parts by weight) | | | | | | | | |
| NR | 100 | 100 | 100 | 100 | 100 | 100 | 100 | 100 |
| Carbon Black A | 60 | 55 | 55 | 60 | 60 | 60 | 60 | 60 |
| Glass fibers | 10 | 10 | 10 | — | 10 | 10 | 10 | 10 |
| HIGILITE H43 | 5 | 5 | — | — | — | — | 0.5 | 20 |
| Suprex | — | — | 5 | — | — | — | — | — |
| HIGILITE H21 | — | — | — | — | — | 5 | — | — |
| Softener | 28 | 28 | 28 | 25 | 28 | 28 | 28 | 28 |
| Sulfur | 1.2 | 1.2 | 1.2 | 1.2 | 1.2 | 1.2 | 1.2 | 1.2 |
| Vulcanization accelerator | 1.5 | 1.5 | 1.5 | 1.5 | 1.5 | 1.5 | 1.5 | 1.5 |
| Mohs hardness of glass fibers | 6.5 | 6.5 | 6.5 | — | 6.5 | 6.5 | 6.5 | 6.5 |
| Average particle-size of carbon black | 0.03 μm | 0.03 μm | 0.03 μm | 0.03 μm | 0.03 μm | 0.03 μm | 0.03 μm | 0.03 μm |
| Mohs hardness of inorganic powders | 3 | 3 | 2 to 2.5 | — | — | 3 | 3 | 3 |
| Average particle-size | 0.6 μm | 0.6 μm | 0.3 μm | — | — | 25 μm | 0.6 μm | 0.6 μm |
| Rubber hardness | 56 | 55 | 55 | 55 | 55 | 56 | 55 | 59 |
| Degree of dispersion of carbon black | GOOD 97% | GOOD 96% | GOOD 96% | GOOD 97% | BAD 90% | GOOD 97% | BAD 90% | GOOD 98% |
| Performance on ice | 105 | 108 | 106 | 100 | 105 | 105 | 105 | 100 |
| Performance on snow | 6 | 7 | 7 | 6 | 7 | 6 | 7 | 6 |
| Abrasion resistance | GOOD 105 | GOOD 102 | GOOD 103 | GOOD 100 | BAD 97 | BAD 96 | BAD 97 | BAD 95 |

In Comparative Example 2, the hardness was adjusted with a softener, and dispensability of carbon black and the abrasion resistance were decreased.

In Example 1, mixing inorganic powders softer than glass fibers and larger than carbon black improved dispersibility of carbon black and provided the sufficient abrasion resistance remaining the performance on snow and ice road, although slightly increased the hardness. In Example 2, replacing a part of the carbon black with an equal amount of inorganic powders improved dispersibility of carbon black and provided the sufficient performance on snow and ice road and the sufficient abrasion resistance remaining the hardness. In Example 3, inorganic powders of a slightly small Mohs hardness and a small average particle-size provided the sufficient performance on snow and ice road and the sufficient abrasion resistance.

In Comparative Example 3, inorganic powders having a diameter of not less than 25 μm reinforced the rubber insufficiently and decreased the abrasion resistance, although increased dispersibility of carbon black. In Comparative Example 4, a small amount of inorganic powders did not increase dispersibility of carbon black. In Comparative Example 5, a large amount of inorganic powders reinforced the rubber insufficiently and decreased the abrasion resistance although increased dispersibility of carbon black.

The inorganic powders preferably have an average particle-size of not more than 25 μm and are used in an amount of 0.5 to 20 parts by weight.

TABLE 2

|  | Ex. 4 | Prior Art | Comp. Ex. 6 | Comp. Ex. 7 | Comp. Ex. 8 | Comp. Ex. 9 |
| --- | --- | --- | --- | --- | --- | --- |
| Raw materials (parts by weight) | | | | | | |
| NR | 100 | 100 | 100 | 100 | 100 | 100 |
| Carbon Black B | 60 | 60 | 60 | 60 | 60 | 60 |
| Glass fibers | 10 | — | 10 | 10 | 10 | 10 |
| Silicone rubber powders | 10 | — | — | — | 0.5 | 20 |
| Softener | 28 | 25 | 28 | 25 | 28 | 28 |
| Sulfur | 1.2 | 1.2 | 1.2 | 1.0 | 1.2 | 1.2 |
| Vulcanization accelerator | 1.5 | 1.5 | 1.5 | 1.2 | 1.5 | 1.5 |
| Change with the passage of time | B | B | C | B | C | A |
| Hardness before heat aging | 55 | 55 | 55 | 55 | 55 | 55 |
| Hardness after heat aging | 59 | 60 | 62 | 59 | 62 | 58 |
| ΔHardness | 4 | 5 | 7 | 4 | 7 | 3 |
| Performance on ice | 106 | 100 | 105 | 105 | 105 | 105 |
| Performance on snow | 7 | 6 | 7 | 7 | 7 | 7 |
| Abrasion resistance | 100 | 100 | 100 | 94 | 100 | 89 |

In Comparative Example 6, the rubber hardness was adjusted with a softner, but increased with heat aging. In Comparative example 7, the rubber hardness was adjusted by vulcanization system, and did not decrease a change with the passage of time, but the abrasion resistance was decreased.

In Example 4, using silicone rubber powders having a high oil absorption with a softner provided a high performance on snow and ice road, inhibited the abrasion resistance from decreasing, and decreased the heat aging.

Comparative examples 8 and 9 show that silicone rubber powders did not decrease a change with the passage of time in a small amount, such as 0.5 parts by weight, and decreased the abrasion resistance in a large amount, such as 20 parts by weight. Silicone rubber powders are used preferably in an amount of 1 to 15 parts by weight.

The rubber composition comprising a specific kind of inorganic powders of the presenet invention has an increased performance on snow and ice road and an increased abrasion resistance remaining dispersibility of reinforcing agents without increased rubber hardness.

The rubber composition comprising silicone rubber powders of the present invention has an increased abrasion resistance and an increased snow and ice performance, and is not increased in the rubber hardness with the passage of time.

What is claimed is:

1. A studless tire having a tire tread containing a rubber composition, wherein said rubber composition comprises (a) a diene rubber, 2 to 30 parts be weight of (b) glass fibers, (c) at least one member selected from the group consisting of carbon black and silica, and 1 to 15 parts by weight of (d-1) aluminum hydroxide softer than the glass fibers and having an average particle-size of less than 25 μm and/or (d-2) silicone rubber powders based on 100 parts by weight of the diene rubber.

2. The studless tire of claim 1, wherein the aluminum hydroxide has a Mohs hardness of less than 6.5 and an average particle-size of not less than 0.03 μm.

3. The studless tire of claim 1, which further comprises a softener.

4. The studless tire of claim 1, which comprises said (d-1) aluminum hydroxide component.

5. The studless tire of claim 4, wherein the aluminum hydroxide has a Mohs hardness of less than 6.5 and an average particle-size of not less than 0.03 μm.

* * * * *